United States Patent [19]
Bentley et al.

[11] Patent Number: 5,408,366
[45] Date of Patent: Apr. 18, 1995

[54] APPARATUS AND METHOD FOR DETECTING AND VALIDATING FORMATTED BLOCKS ON MAGNETIC TAPE

[75] Inventors: Steven R. Bentley; Rickey W. Murray; Sushama M. Paranjape; Fernando Quintana, all of Tucson, Ariz.

[73] Assignee: International Business Machines Corporation, Armonk, N.Y.

[21] Appl. No.: 77,162

[22] Filed: Jun. 14, 1993

[51] Int. Cl.⁶ .................................................. G11B 5/09
[52] U.S. Cl. ..................................................... 360/53
[58] Field of Search .................. 360/53, 48, 45, 46, 360/51, 77.15, 77.06, 77.04

[56] References Cited

U.S. PATENT DOCUMENTS

| | | | |
|---|---|---|---|
| 4,479,194 | 10/1984 | Fogg et al. | 364/900 |
| 4,506,305 | 3/1985 | Cardero | 360/46 |
| 4,729,045 | 5/1988 | Baugh | 360/46 X |
| 4,901,035 | 2/1990 | Cleveland | 360/51 X |
| 5,005,168 | 4/1991 | Cummiskey et al. | 370/24 |
| 5,121,262 | 6/1992 | Squires et al. | 360/53 X |
| 5,237,552 | 8/1993 | Masood et al. | 369/54 |
| 5,239,423 | 8/1993 | Sadowski | 360/53 X |
| 5,255,270 | 10/1993 | Yanai et al. | 360/53 X |
| 5,258,852 | 11/1993 | Kamijima | 360/53 X |
| 5,267,100 | 11/1993 | Ichijo et al. | 360/53 |
| 5,283,483 | 2/1994 | Laber et al. | 307/520 |

Primary Examiner—Donald Hajec
Assistant Examiner—Thien Minh Le
Attorney, Agent, or Firm—Baker, Maxham, Jester & Meador

[57] ABSTRACT

An apparatus and method for detecting and validating formatted blocks during read/write data operations in a magnetic tape data storage system includes component functionality for reading and writing data on a magnetic tape medium in a plurality of modes, including a read-only (R) mode and a read-while-write (RWW) mode, the data being arranged in one or more tracks in a sequence of formatted blocks. In preferred embodiments, formatted block detection and validation is performed by appropriate logic circuitry configured to detect at least one formatting entity representing an inter-block gap, a block acquisition burst, a synchronization character, or any other desired formatting entity, using first and second programmable detection thresholds that are the same or substantially the same in both the R and RWW modes. In addition, a validation determination is made in the RWW mode whether detection of the formatting entity satisfies an RWW error threshold that is greater than either of the first and second programmable detection thresholds. If the RWW error threshold is not satisfied, a message is generated indicating that a write retry may be required. In this way, the detection of various formatting entities is achieved uniformly during the R and RWW modes but provision is also made for applying a more stringent threshold criteria during the RWW mode for write validation.

21 Claims, 6 Drawing Sheets

APPARATUS AND METHOD FOR DETECTING AND VALIDATING FORMATTED BLOCKS ON MAGNETIC TAPE

BACKGROUND OF THE INVENTION

The present invention relates generally to the recording and retrieval of digital information on magnetic tape, and more particularly, to the detection and validation of formatted magnetic tape data during read/write data transfer operations to and from the magnetic tape medium.

Magnetic tape drive standards for the recording of digital information on streaming magnetic tape media contemplate the storage of data in one or more tracks (channels) in a sequence of formatted blocks. Each block contains formatting entities utilized by the tape drive controller to oversee and manage the flow of information to and from the tape and to control the magnetic heads and other hardware used during read/write operations.

Formatting entities of interest relative to the present invention include the boundary areas between each block, known as inter-block gaps or IBGs, and entities within the blocks including acquisition burst patterns, intermediate burst patterns, and byte synchronization characters. When engaging in read/write operations, conventional tape drive controllers utilize these formatting entities to acquire essential timing and control information. For example, the presence of an inter-block gap indicates to the controller that a formatted block is approaching and that the controller should next expect an acquisition burst indicating that the block has arrived. When the acquisition burst is sensed, bit synchronization (clocking) of the track read circuits is commenced and the controller begins waiting for the byte synchronization characters. When a sufficient number of byte synchronization characters are detected, the read circuits are byte synchronized and data transfer operations within the formatted block are commenced. Subsequent formatting entities within the block (e.g. resynchronization bursts and resynchronization characters) help maintain bit and byte synchronization as the block is processed.

In some prior art tape drives, the detection and validation of formatted blocks during read/write- data transfer operations is performed by microcode routines executed by the tape drive controller. For example, microcode has been used to perform inter-block gap detection by sampling a register containing bit pattern information reported by the magnetic head and detection circuitry. The microcode subsequently responds to an interrupt from the hardware when the inter-block gap pattern has terminated, at which time the microcode resorts to polling another register to determine if burst acquisition has occurred. If burst acquisition does not occur after a predetermined time, the microcode must perform error recovery. If burst acquisition occurs and the hardware detects a beginning synchronization character, another interrupt is generated to indicate to the microcode that data is now ready for processing. However, in many eases, the microcode is so overloaded that it does not have time to respond to the interrupt and therefore resorts to polling yet another register to determine when the beginning synchronization character bit is set. Again, if the beginning synchronization character is not detected within a specified time, the microcode must again invoke an error recover routine. If enough high-priority interrupts occur during this process, entire blocks can be missed, which in turn requires repositioning and read/write retries. It would be desirable therefore, to provide a magnetic tape data storage device which does not require extensive utilization of microcode resources to perform block detection and validation operations.

It would be further advantageous to provide programmability in the detection and validation of formatted data blocks for plural modes of operation of the tape drive device. Typical modes of operation of magnetic tape storage devices include read-only and read-while-write. Within the context of the present invention, "detection" refers to sensing a formatting entity in any operational mode using detection threshold criteria. "Validation" refers to sensing a formatting entity in a read-while-write mode using validation threshold criteria in order to "validate" what was written. In prior art tape drive devices, inter-block gaps, acquisition bursts and synchronization characters are preprogrammed to detect differently in read-while-write than in read-only. A higher detection criteria is required for read-while-write than for read-only, and the higher read-while-write detection criteria is also used as a write validation criteria. This insures that satisfactory data recording is maintained and permits write retries if recorded data does not meet or exceed the more stringent criteria applicable to the read-while-write mode. However, the need to use a higher validation criteria during read-while-write also raises the read-while-write detection criteria because the two criteria (i.e., read-while-write detection and validation) are the same.

A disadvantage of using preprogrammed, non-uniform detection criteria in the read and read-while-write modes is that block formatting entities may be detected at different portions of the tape in each mode. For example, a lower read-only criteria may result in detection of an acquisition burst before burst detection occurs in the read-while-write mode. Acquisition bursts are used to initiate frequency lock in the phase lock loop (PLL) circuits for bit synchronization. If different criteria are used to detect the acquisition burst in the read-only mode than when a block is written, a different portion of the beginning burst may be used for clock acquisition, and if that portion of the tape is defective, the clock may not be able to lock on to the data at all. It would be preferable to commence clock acquisition at the same location on the tape, regardless of mode.

Another disadvantage arising from the use of preprogrammed non-uniform detection criteria in different operational modes of the tape drive results when write-skipping is performed. In write-skipping, a data write error results in a write retry being made without rewinding the tape. The tape drive finishes writing blocks in the pipeline and then executes the write retry. Write errors can result from debris causing the tape to lift away from the write heads momentarily. The microcode generates a write error because the read circuits do not detect the block using the read-while-write threshold criteria. In some cases, the portion of the tape causing the write error contains old blocks of data. Because the write retry occurs downstream, however, the old data blocks remain on the tape and may be read during subsequent reading of the tape (using the less-stringent read-only criteria), resulting in block ID sequence errors or data integrity errors.

Accordingly, there is an evident need in the art for a magnetic tape drive device that overcomes the foregoing disadvantages by implementing formatted block detection and validation operations in hardware and by employing programmable detection and validation criteria across plural modes of operation of the tape drive. A hardware-based system would remove much of the block detection and validation overhead from the controller microprocessor. Providing programmable detection and validation criteria would permit the application of nominally uniform detection criteria across plural operational modes, yet still allow the use of different validation criteria, as well as different detection criteria under special circumstances.

SUMMARY OF THE INVENTION

In accordance with the foregoing objectives, an apparatus and method for detecting and validating formatted blocks during read/write data operations in a magnetic tape data storage system are provided. The magnetic tape data storage system includes component functionality for reading and writing data on a magnetic tape medium in a plurality of modes, including a read-only (R) mode and a read-while-write (RWW) mode, the data being arranged in one or more tracks in a sequence of formatted blocks. In preferred embodiments of the invention, formatted block detection and validation is performed by appropriate logic circuitry configured to detect at least one formatting entity representing an inter-block gap, a block acquisition burst, a synchronization character, or any other desired formatting entity, using first and second programmable detection thresholds that are the same or substantially the same in both the R and RWW modes. In addition, a validation determination is made in the RWW mode whether detection of the formatting entity satisfies a RWW error threshold that is greater than either of the first and second programmable detection thresholds. If the RWW error threshold is not satisfied, a message is generated indicating that a write retry may be required. In this way, the detection of various formatting entities is achieved uniformly during the R and RWW modes but provision is also made for applying a more stringent threshold criteria during the RWW mode for write validation.

BRIEF DESCRIPTION OF THE DRAWINGS

FIG. 4b is a second portion of the flow diagram of FIG. 4a.

FIG. 4c is a third portion of the flow diagram of FIG. 4a.

DETAILED DESCRIPTION OF THE PREFERRED EMBODIMENTS

A. TAPE FORMATTING

Figure 1:
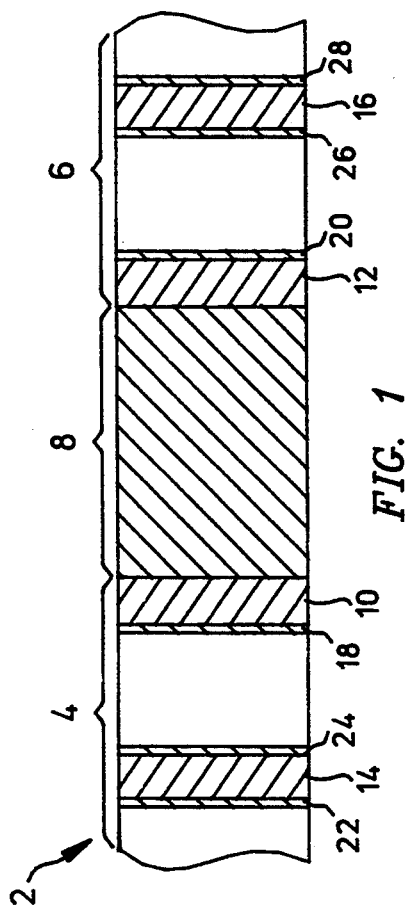
FIG. 1 is a diagrammatic view of a section of magnetic tape having formatted data blocks recorded thereon.

Referring now to FIG. 1, a magnetic tape medium 2 is provided for recording one or more parallel data tracks (not shown) oriented in a horizontal direction relative to the figure. Data recording may be performed in one direction or bi-directionally. The data is arranged in sequential formatted blocks, two of which are partially shown in FIG. 1 by reference numbers 4 and 6. The formatted blocks 4 and 6 are separated by an inter-block gap 8 (IBG). The formatted blocks 4 and 6, as well as the IBG 8, contain data patterns representing formatting entities that are used to detect and validate the formatted blocks during read/write data transfer operations. More specifically, the formatting entities provide information for acquiring bit synchronization and byte synchronization on each concurrently recorded data track.

The formatting entities of interest herein include acquisition bursts, resynchronization bursts, and synchronization characters within the physical blocks, as well as the IBG's themselves. The formatted blocks 4 and 6 each include acquisition bursts 10 and 12, respectively, with acquisition burst 10 being located in the end of block 4 and acquisition burst 12 being located at the beginning of block 6. The formatted blocks 4 and 6 also include a plurality of resynchronization bursts, two of which are shown in FIG. 1 as reference numbers 14 and 16. Adjacent to each acquisition burst and synchronization burst are one or more synchronization characters. The acquisition bursts 10 and 12 are bounded by synchronization characters 18 and 20, respectively. The resynchronization burst 14 in formatted block 4 is bounded by a pair of synchronization characters 22 and 24. The resynchronization burst 16 in formatted block 6 is bounded by a pair of resynchronization characters 26 and 28.

The acquisition bursts and resynchronization bursts are both used to allow frequency and bit synchronization of the track clocking circuits used to read and write data on the tape. They are formed by repeating patterns of characters. Acquisition bursts are preferably longer than synchronization bursts. They occur at the beginning and end of each physical block, whereas the resynchronization bursts appear between the ends of a physical block. Acquisition bursts are designed to allow the read clocks for all tracks currently being read to simultaneously acquire bit synchronization to the data. The length of the acquisition bursts is dependent on the maximum amount of skew across the tape and other factors so that all tracks will receive the acquisition bursts simultaneously, and so that a common clock component may be used to acquire track wide bit synchronization. Resynchronization bursts are provided to allow the individual track read clocks to reacquire bit synchronization within a physical block. Since they are designed to allow individual tracks to be resynchronized, there is no requirement that all tracks read the resynchronization bursts simultaneously. Therefore, resynchronization bursts need not be as wide as the acquisition bursts.

Synchronization characters are used to achieve byte synchronization of the detection circuits to the data boundaries. They allow the controller to verify that a given track is in character synchronization or to allow the track to achieve character synchronization if it is not synchronized. The synchronization characters are placed after the initial acquisition bursts, before the final acquisition bursts, and before and after each resynchronization burst. Typically, a synchronization character is a character having a single encoded value. Byte synchronization is achieved across the tracks when the first synchronization characters are encountered following the initial acquisition burst. Alignment is achieved by knowing when each concurrent track encounters a synchronization character and receiving subsequent data bytes in the proper order.

The IBG 8 is an area where no host data is recorded. Preferably, IBG is encoded with a repeating pattern of low frequency data, preferably outside the run length limited encoding of the host data. For example, if a (1,7) RLL encoding scheme is used, the IBG could be encoded with a low frequency "1000000001000000000 . . . " data pattern which is outside the RLL encoding. This is in contrast to the acquisition and resynchronization bursts which typically have a high frequency data pattern at the highest frequency of the RLL encoding. For example, given a (1,7) RLL encoding scheme, the acquisition bursts and resynchronization bursts could be encoded with a repeating "101010 . . . " data pattern.

The IBG 8 typically is much longer than the acquisition and resynchronization bursts. It provides an area where write appends are begun in order to prevent corruption of previously written data. The IBG also provides a formatting entity, along with the acquisition bursts, resynchronization bursts and synchronization characters, for use in acquiring essential timing and control information.

B. PROCESS OVERVIEW

In preferred aspects of the invention, a comprehensive method is provided for detecting and validating the Beginning-Of-Block (BOB) and validating the End-Of-Block (EOB) (for backward data reading) in multiple-track blocks during read data flow operation (RDF). The method ensures successful detection and validation of BOB when a block is read at a later time by using read-while-write (RWW) thresholds to verify appropriate margins while writing the IBG, burst, and synchronization character markers.

Three events must occur in order for the RDF to determine the presence of a block on tape. First, the IBG must be detected to distinguish the expected beginning burst from a resync burst. Second, the beginning burst must be detected early to provide the PLL acquisition time and to open the window for detection of the first synchronization character. Third, a majority of tracks must detect the synchronization character marker to establish byte synchronization. These formatting entities must also be validated in the RWW mode.

In order to determine the transition from IBG to beginning burst, the IBG must first be detected. The detection of IBG requires that a majority of tracks detect a specified number of consecutive IBG intervals sometime during the search for the IBG. It is not required that all tracks detect the pattern nor that individual tracks detect it at the same time. However, when writing the IBG pattern (during RWW), the RDF makes sure, for validation, that all tracks, or at least a substantial majority of tracks, have detected a consecutive number of IBG intervals which exceeds that required for detection.

Three interval count values pertaining to the IBG are programmable. These are the number of consecutive intervals required to detect an IBG during a read-only operation, the number required for detection during a RWW operation, and the RWW error threshold used for validation. In a majority of cases, the first two count values will be equal or at least substantially similar. The RWW error threshold count is preferably higher than either the read-only or the RWW threshold count, and defines the minimum length of a good IBG pattern required to avoid a write retry while in the RWW mode. An example of three interval count thresholds for IBG detection and validation would be eight, eight and sixteen.

Since the IBG is relatively long and its pattern outside the RLL code, the point where it is detected is not critical. When a track determines that the requisite number of consecutive IBG intervals have been detected, an IBG DETECT latch is set. If and when a majority of tracks have their IBG DETECT latch set, the IBG has by definition been detected. Two IBG DETECT vote threshold values are used and are programmable. These are the minimum number of track IBG DETECT signals required to constitute an IBG during a read-only operation, and the number required during a RWW operation. In the majority of cases, the two vote threshold values will be equal. An example of an IBG vote threshold would be twelve out of sixteen tracks.

Another latch, IBGERR, is initially set and is cleared only if the number of consecutive IBG intervals detected in each of the tracks equal or exceed the more stringent RWW error threshold. This latch is used to indicate to the microcode that the block should be rewritten with the intent of writing a more detectable IBG.

Advantageously, if the RDF has just successfully read a block, an IBG following that block is implied, and the data flow can relax IBG detection by reducing (e.g. by half) the number of consecutive IBG intervals required. This relaxation of detection criteria increases the probability that the IBG will be detected, which is necessary to confirm the position of the read head between blocks. Once an IBG-to-burst transition is detected, the IBG detection criteria is restored to the non-relaxed value. In similar fashion, a higher IBG threshold (HOTIBG) can be set (e.g. raised by half) while a block is being read. This threshold anticipates the possibility that a block being read may have been partially overwritten by another block. The higher HOTIBG threshold ensures that only a true IBG will be detected before deciding that a new block has been encountered. Once the End-Of-Block (EOB) has been reached, the HOTIBG is relaxed and the nominal IBG threshold is restored. While the IBG read-only and RWW interval count thresholds can be changed, the RWW error criteria for clearing the IBGERR latch is not changed in order to provide, in RWW operation, sufficiently robust IBG in all tracks to guarantee detection later.

The parameters that determine the presence of burst are fundamentally the same as those used for IBG determination. When a track determines that the requisite number of consecutive burst intervals have been detected, a BURST DETECT latch is set. If and when a majority of tracks have their BURST DETECT latch set, the burst has by definition been detected. Three programmable burst interval count values and two programmable track voting threshold values are provided. Once again, the same or substantially the same number of consecutive burst intervals are usually employed for detection in the read-only mode and in the RWW mode. A burst RWW error threshold for consecutive intervals is also used to validate that the first portion of the beginning burst is robust in the RWW mode. An example of the three interval count thresholds for burst detection and validation would be eight, eight and sixteen. Track voting is used to determine that a majority of tracks are currently detecting a burst pattern. An example of a burst vote threshold for both the read-only and RWW modes would be twelve out of sixteen tracks.

Advantageously, when the IBG is detected, the data flow relaxes (e.g. by half) the criteria for detecting burst since a beginning burst is the next pattern expected. This will increase the probability that the beginning burst will be detected early which, in turn, increases the probability that clock acquisition will be completed within the burst. Once the synchronization character has been subsequently detected, the criteria for detection of burst is restored to the original value. This allows the RDF to better distinguish subsequent resync bursts from burst-like intervals in the data.

The global detection and validation of synchronization characters is controlled by three programmable vote thresholds. The first is the number of tracks that have detected the synchronization character marker in order to confirm detection during a read-only operation. The second is the number of tracks required for detection in a RWW operation. The third is a RWW error vote threshold used for validation that determines the minimum number of perfect synchronization characters that must be detected in the RWW mode to avoid setting a Beginning Sync Error status bit. Once again, the first two values are normally the same (e.g. twelve) and the last value is higher (e.g. sixteen) in order to require all tracks to detect their synchronization character, unless that threshold causes too many temporary write errors.

Block detection and validation is assisted by three timeout periods. A first timeout is initiated upon burst detection and PLL acquisition is delayed until expiration of the timeout or a 100% burst vote is detected. This first timeout is used for skew correction to delay PLL acquisition until a point at which all of the tracks should be in burst. A second timeout is initiated at the beginning of PLL acquisition and terminates at a time when PLL acquisition across all tracks is assumed to have occurred. The RDF starts a third timeout after the PLL acquisition is complete that expires beyond the latest point where the synchronization characters should be detected, accounting for worst-case skew. If the synchronization character vote is not satisfied before the third timeout expires, the RDF assumes that the burst detected was not the beginning burst of a block. The RDF then disables block processing and begins the search for another IBG. If an IBG is detected before any of the three timeouts expires, the data flow disables block processing and looks for burst again. In this fashion, the RDF distinguishes between a pseudo burst and a valid beginning burst.

The advantages of providing programmable count and vote threshold values for detection and validation in the RWW and read-only modes become apparent when considering the requirements of a RWW operation known as Read-While-Write-Append (RWWA). The RWWA command instructs the RDF to read one or more formatted blocks before the write formatter begins the write append. A Beginning-Of-Gap (BOG) signal issued after the first block is read is used by the microcode to validate or adjust the write append point. If that first block is not detected using the normal default values, an ERP (error recovery procedure) will attempt to read the block by dynamically reprogramming the read-only consecutive interval count thresholds required for IBG and beginning burst, and the read-only track vote thresholds for IBG, burst and synchronization characters. Once the Read ERP has found the combination of threshold parameters required to detect the block, the RWWA operation is initiated. The RDF uses the read-only parameters for detecting the first block, and then switches detection banks to the RWW parameters which are used for detecting all subsequent blocks.

In summary, the RDF nominally detects a formatted block using the same detection criteria regardless of the mode selected. However, when validating a block during RWW or the RWW operation known as RWWA, the portions of the format required for block detection are screened more thoroughly by using various RWW threshold checks. The results of these checks are reported to the microcode via status registers. The microcode can then determine whether or not to rewrite that block.

C. READ DATA FLOW DETECTION AND VALIDATION LOGIC

Figure 2A:
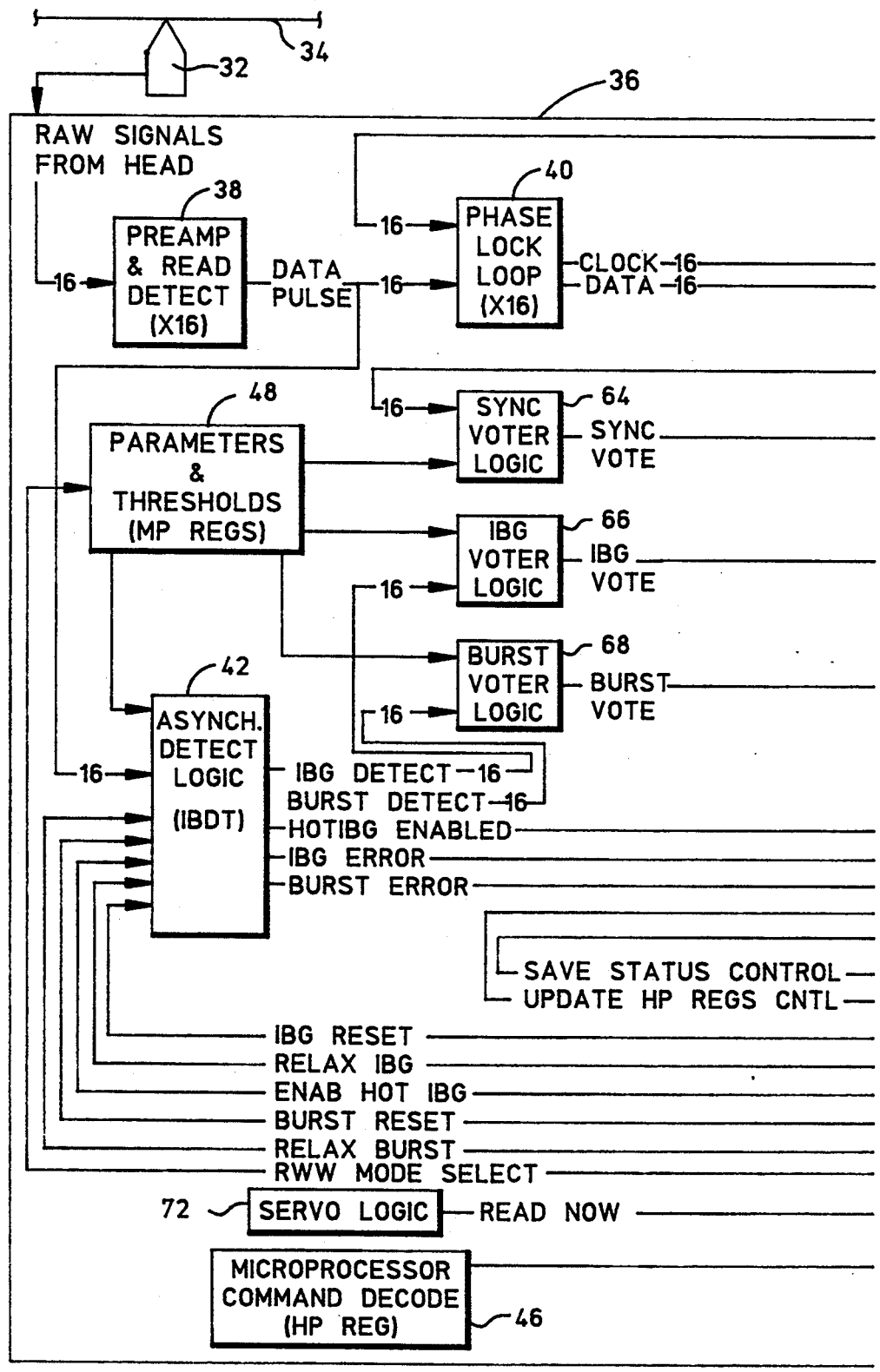
FIGS. 2a and 2b comprise a block diagram illustrating a magnetic tape drive system including circuitry for detecting and validating formatted blocks on magnetic tape.
Figure 2B:
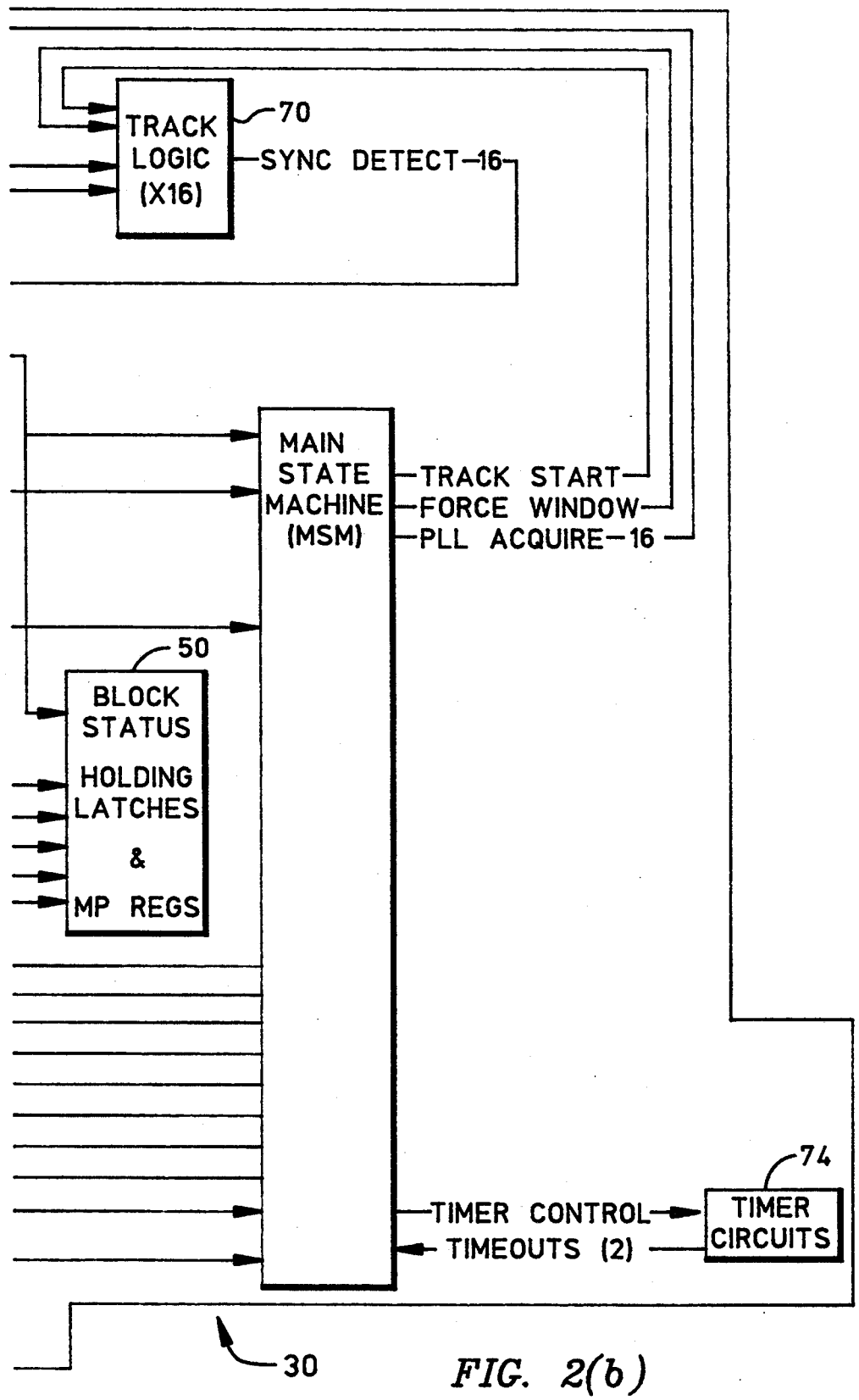

Referring now to FIGS. 2a and 2b, a magnetic tape data storage device 30 includes one or more magnetic heads 32 for reading data on a magnetic tape 34, the tape 34 being formatted in the manner shown in FIG. 1. The tape drive device 30 further includes a tape drive control system having a programmable microprocessor (not shown) and a hardware-based block detection and validation system 36. The detection and validation system 36 includes a preamplifier and read detect circuit 38 of conventional design that receives signal:information from the magnetic read heads 32, and is shown in FIGS. 2a and 2b as having 16 tracks on the tape 34. The preamplifier and read detect circuit 38 amplifies the signals received from the read head 32 and provides a data pulse output to a phase lock loop (PLL) circuit 40 and an asynchronous inter-block gap and burst detection logic circuit (IBDT) 42.

The IBDT circuitry is utilized in conjunction with IBG and acquisition burst detection and validation, while the phase lock loop circuit 42 is used in conjunction with synchronization character detection and validation. Both circuits are controlled by a main state machine 44. The main state machine 44 receives command and control information from a microprocessor command/decode register circuit 46 containing one or more microprocessor storage registers. The main state machine 44 is preferably implemented as an application specific arrangement of combinatorial logic whose configuration is dictated by the state descriptions set forth in more detail hereinafter. Other implementations of the state machine 44 would include programmable logic arrays and microprocessor-based configurations.

The tape drive microprocessor provides programmable threshold values to a parameter and threshold circuit 48 containing banks of microprocessor registers for various operational modes of the tape drive 30 (e.g., read-only, RWW) containing appropriate detection threshold values (and validation threshold values for the RWW mode). The main state machine 44 determines which bank of threshold register values are to be used for validation and detection during each mode. Block detection and validation status information is returned to the microprocessor via a block status circuit 50 containing holding latches and one or more microprocessor status registers arranged to receive input from the holding latches.

The IBDT circuit 42 receives a 16 channel data pulse input from the preamplifier and read detection circuit 38 and contains logic circuitry for identifying and counting selected data pulse intervals (e.g., 101010 . . . and 100000000100000000 . . . ) and comparing the interval count against programmable thresholds stored in the parameter and threshold circuit 48. The IBDT circuit 42 is controlled by the programmed values in the parameter and threshold circuit 48 to detect a predetermined number of successive IBG and burst intervals before setting the IBG DETECT and BURST DETECT latches for each channel satisfying the detection threshold criteria.

Figure 3:
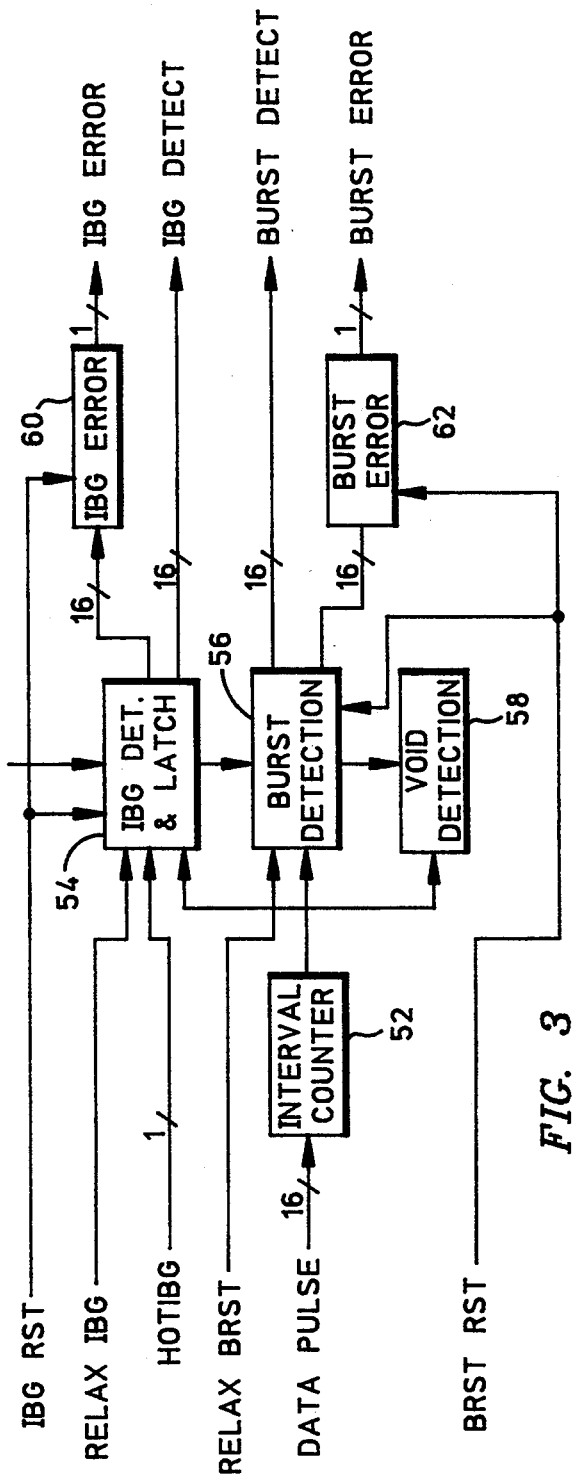
FIG. 3 is a detailed block diagram illustrating a portion of the circuitry of FIG. 2.

FIG. 3 illustrates components of the IBDT circuit which perform these functions. The 16 channel data pulse input is provided to an interval counter circuit 52 that counts the data pulse intervals and outputs an interval count value, for each of the 16 channels of the data pulse input line, to an IBG detection and latch circuit 54, a burst detection and latch circuit 56 and a void detection and latch circuit 58. The detection and latch circuits 54–58 also receive parameter values from the microprocessor register banks of the parameter and threshold circuit 48 and utilize comparator circuitry to compare the interval count values against the programmed interval count threshold values corresponding to the operational mode that is invoked. For example, the IBG and burst detection and latch circuits may each be programmed to set their detection latches when eight consecutive input signals, respectively, are detected. The 16 output channels of the IBG and burst detection and latch circuits 54 and 56 correspond to the 16 data pulse input channels received from the preamplifier and read detection circuit 38. Each detection output channel is either high or low (i.e. 1 or 0) depending on whether the requisite number of intervals is detected, and the corresponding output latch set for that channel. The void detection and latch circuit 58 detects the occurrence of count overflows in the counter 52 indicating the presence of a void area on the tape 34.

The IBG and burst detection and latch circuits 54 and 56 also include read-while-write (RWW) error latches which are initially set high before each detection sequence and are cleared only when the appropriate RWW error threshold is satisfied. The RWW error threshold values are provided by the parameter and threshold circuit 48. As indicated, the RWW error validation thresholds are higher than the read-only and RWW detection thresholds, which are preferably the same or substantially the same in most cases. The error latches provide a 16 channel output which is used to generate the IBG and burst error signals, IBG ERROR and BURST ERROR, respectively. The IBG ERROR and BURST ERROR signals are generated when a predetermined number of the IBG and burst detection latches are not cleared. This can be done by appropriate track voting circuitry or, preferably by logically Or-ing the outputs of each of the RWW error latches, which effectively requires that 100% of the tracks satisfy the RWW error threshold in the RWW mode. This preferred embodiment is implemented by IBG error circuit 60 and burst error circuit 62. IBG error circuit 60 contains appropriate logic for generating the IBG ERROR signal and is preferably a logical Or circuit. BURST ERROR circuit 62 contains the same logic. As indicated, appropriate voting logic could be employed if it is desired to vary the number of tracks capable of satisfying .the RWW error threshold.

Returning now to FIGS. 2a and 2b, there are three voter logic circuits 64, 66 and 68 used in detecting synchronization characters, IBG patterns and burst patterns, respectively. The voter logic circuits are used to count the number of tracks reporting detection signals. If the number of reporting tracks meets or exceeds the vote threshold provided by microprocessor register banks in the parameter and threshold circuit 48, a vote signal from the corresponding voter logic circuit will so indicate. The voter logic circuits can be implemented using carry look ahead adders that add up the number of tracks reporting detection signals. A comparator compares this sum to the programmed vote threshold values corresponding to the operational mode that is invoked.

The sync voter logic circuit 64 receives its 16 channel input from a track logic circuit 70. The track logic circuit 70 produces a synchronized detection signal output from the clocking and data inputs provided by the phase lock loop circuit 40. The track logic circuit 70 is controlled by signals from the main state machine 44, including the TRACK START and FORCE WINDOW signals, which are described in more detail hereinafter. The phase lock loop circuit 40 is controlled by the main state machine 44 via a 16 channel PLL ACQUIRE signal, which is also described in more detail hereinafter.

The IBG voter logic circuit 66 is fed by the IBG DETECT outputs from the detection latches of the IBG detection and latch circuit 54, and also by an IBG vote threshold value from the parameter and threshold circuit 48. The burst voter logic circuit 68 is fed by the BURST DETECT outputs from the detection latches of the burst detection and latch circuit 54, and also by a burst vote threshold value from the parameter and threshold circuit 48. The IBG VOTE and BURST VOTE outputs of the IBG voter logic and burst voter logic circuits 66 and 68, respectively, are provided to the main state machine 44. The SYNC VOTE output from the sync voter logic circuit 64 is provided to the main state machine 44.

The IBDT circuit 42 provides the IBG ERROR signal and BURST ERROR signal to holding latches in the block status circuit 50, in order to report these signals to the microprocessor, also via the microprocessor status register in the block status circuit. A HOTIBG ENABLED signal, described in more detail hereinafter, is further reported by the IBDT detection circuit 42 to a holding latch in the block status circuit 50, and is subsequently provided to the tape drive microprocessor in the same fashion.

The main state machine 44 controls the IBDT circuit 42 through five input lines identified as IBG RESET, RELAX IBG, ENAB HOT IBG, BURST RESET and RELAX BURST. The IBG RESET line clears the IBG detection and latch circuit 54. The BURST RESET circuit clears the burst detection and latch circuit 56. The RELAX IBG line relaxes the IBG interval count threshold used by the IBG detection and latch circuit 54. The RELAX BURST line relaxes the interval count threshold used by the burst detection and latch circuit 56. The ENAB HOT IBG signal increases the IBG interval count threshold used by the IBG detection and latch circuit 54.

The main state machine 44 also controls the IBDT circuit 42 by switching between threshold register banks in the parameter and threshold circuit 48 via an input line identified as RWW MODE SELECT. The RWW MODE SELECT line programs the threshold parameter inputs provided to the IBDT circuit 42 from the read-only threshold register bank to the RWW threshold register bank and vice versa. Additional circuits used by the block detection and validation system 36 include a servo logic circuit 72 and the timer circuit 74, both of which are described in more detail hereinafter.

D. FORMATTED BLOCK DETECTION AND VALIDATION

Figure 4A:
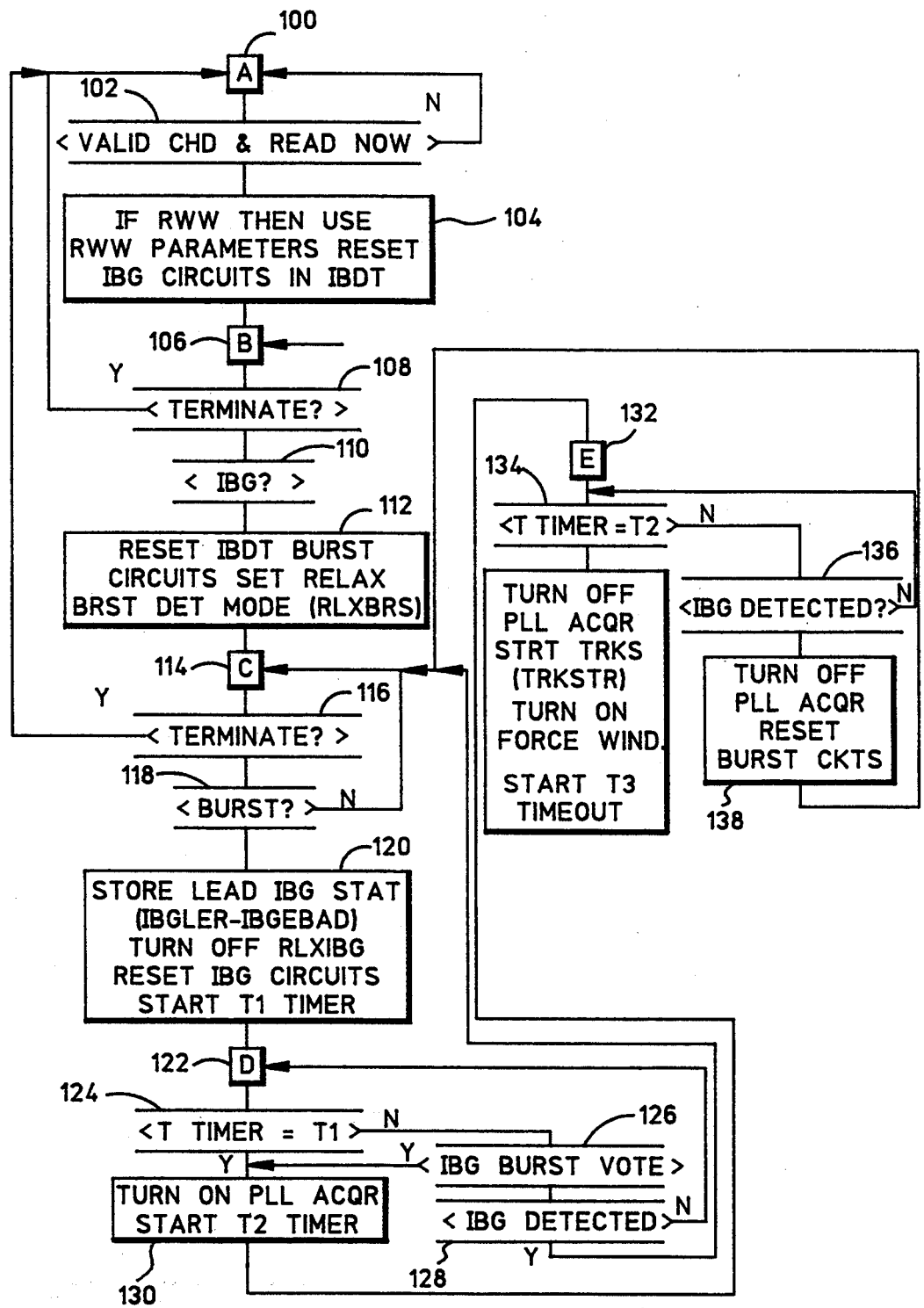
FIG. 4a is a first portion of a flow diagram illustrating a method for detecting and validating formatted blocks on magnetic tape.
Figure 4B:
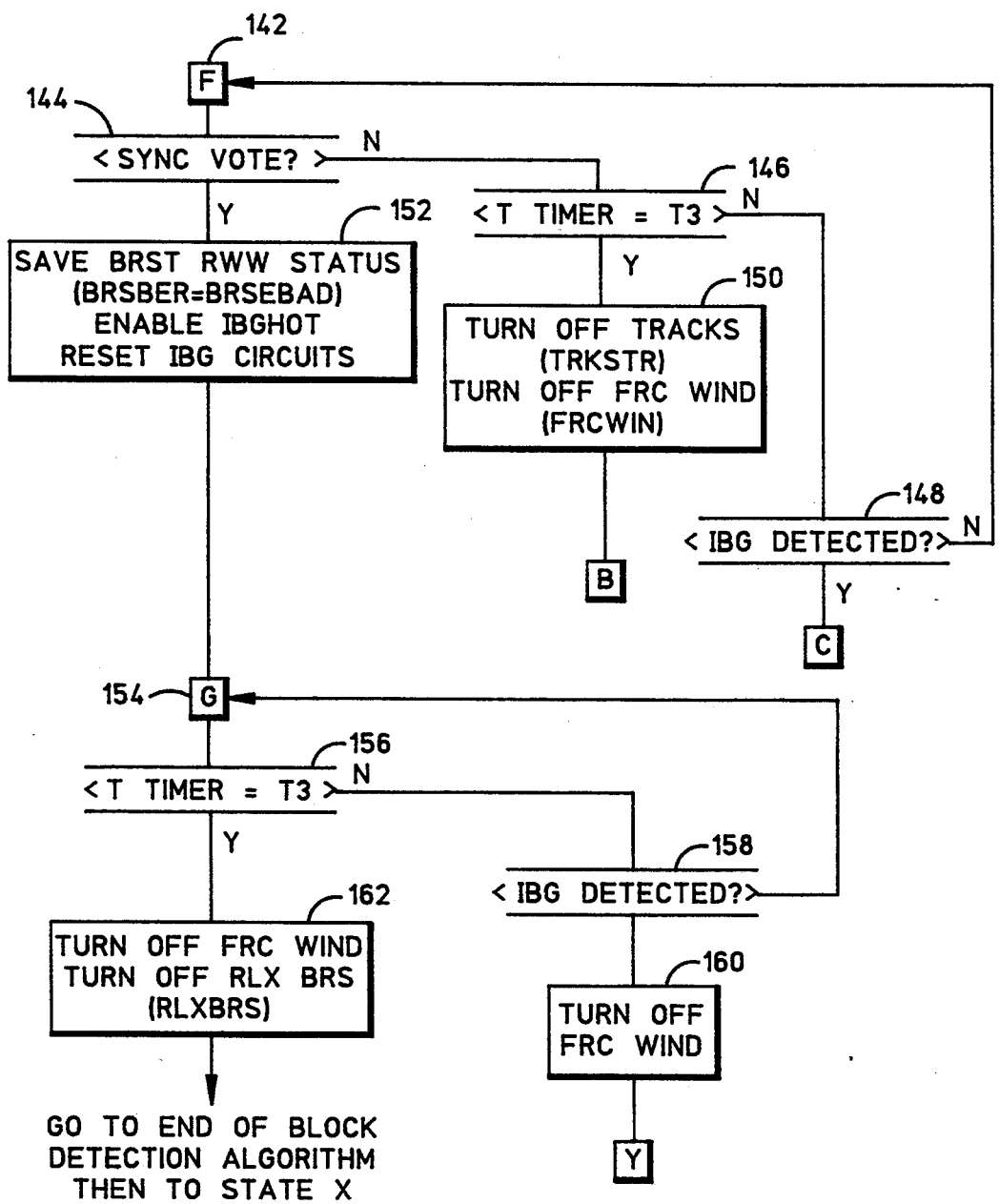
Figure 4C:
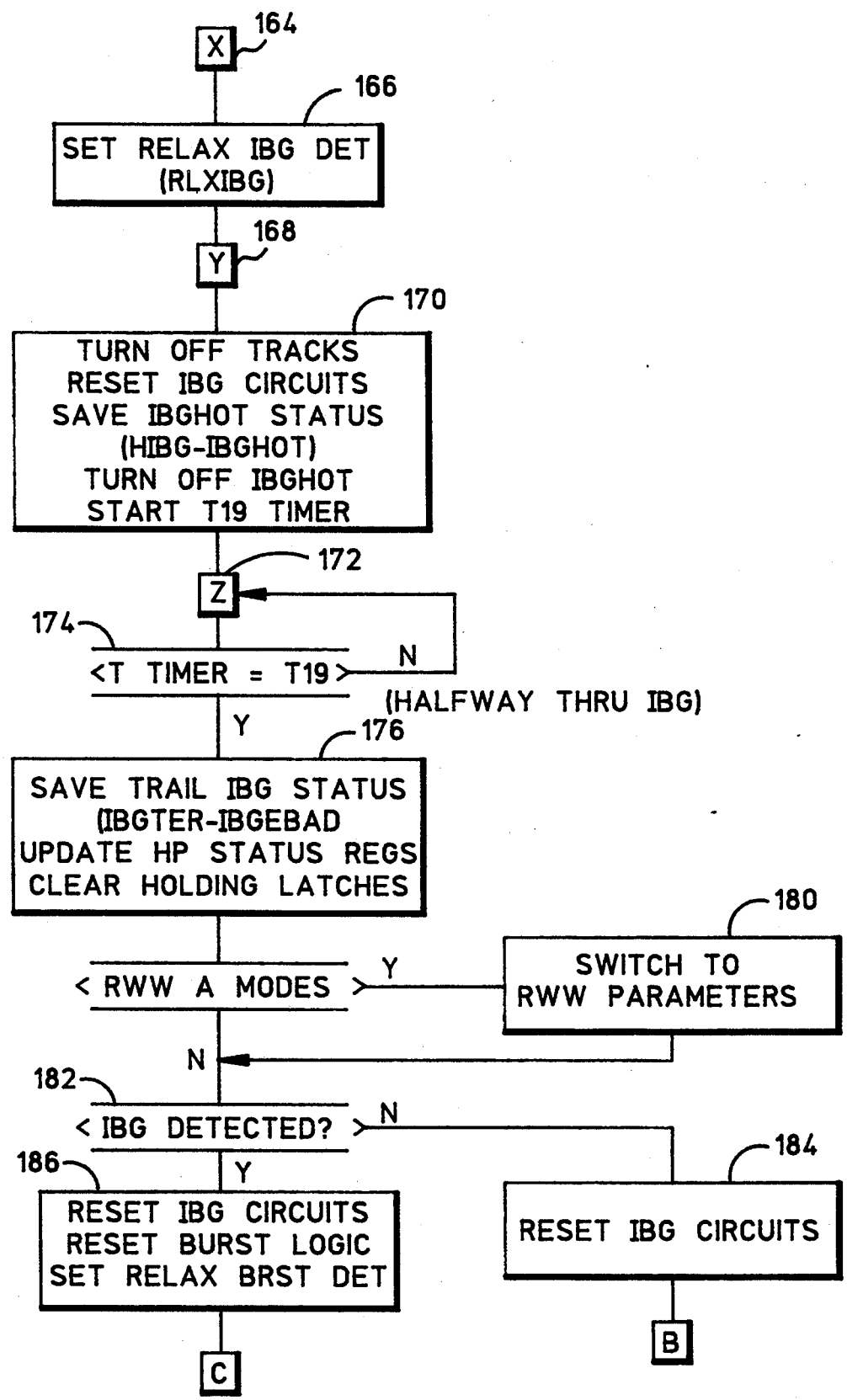

Referring now to FIGS. 4a–4c, the main state machine 44 contains sequential and combinatorial logic that implements a block detection and validation sequence beginning in state A, which is illustrated in FIG. 4a as process step 100. In initial state A, the main state machine 44 waits for a valid Read Command and a Read Now signal from the servo logic circuit 72. This test occurs in process step 102. The main state machine must receive a valid Read Command or the Read Now command will not cause a read operation to occur. Prior to the Read Command, the microcode from the tape drive microprocessor will have set the mode of operation and all of the thresholds in the parameter and threshold circuit 48 to be used during the read operation. In addition, provision may be made for default thresholds in the event the microcode does not provide initial thresholds. It is preferred that the default thresholds be sufficient to read a "good" multi-track (e.g. 16 track) tape. However, in the anticipation of unforeseen problems, the microcode is allowed to "fine tune" the operation of the logic by changing various parameters.

Upon the occurrence of a valid Read Command loaded by the microcode, and the occurrence of a Read Now signal from the servo logic circuit 72, the main state machine advances to process step 104. There, the main state machine 44 switches to RWW parameters via the RWW MODE SELECT line if the RWW mode is programmed, so that the corresponding RWW threshold values in the parameter and threshold circuit 48 are selected for use. The main state machine 44 then clears the IBG detection and latch circuit 54 and advances to state B, which is identified in FIG. 4a by reference number 106.

In state B, the main state machine 44 begins looking for the IBG data pattern. The IBG detection indicator is supplied to the main state machine 44 by the IBG voter logic circuit 66, which performs a vote of the IBG detection indicators arriving from the IBDT detection circuit 42 on the IBG DETECT lines. As indicated, the IBG vote criteria are programmable in the parameter and threshold circuit 48 by the microcode and are mode selectable (i.e., programmable) by the main state machine 44. The main state machine will wait indefinitely in the IBG detection state unless the microcode issues a TERMINATE command in process step 108, which forces the main state machine back to state A. If IBG is detected in process step 110, the main state machine performs process step 112 by clearing the burst detection and latch circuit 56 and setting the IBDT detection circuit 42 to a Relax Detect Burst mode via the RELAX BURST line. The main state machine 44 then advances to state C, which is shown by reference number 114 in FIG. 4a.

In state C, the main state machine begins looking for a valid burst pattern. The burst detection indication is supplied to the main state machine 44 by the burst voter logic circuit 68, which performs a vote of the burst indicators arriving from the IBDT detection circuit 42 on the BURST DETECT lines. As indicated, the burst vote criteria are programmable in the parameter and threshold circuit 48 by the microcode and are mode selectable (i.e., programmable) by the main state machine 44. The main state machine 44 will wait indefinitely in the burst detection state, until it sees burst, or unless the microcode issues the TERMINATE command in process step 116, which forces the state machine back to state A.

When burst occurs in process step 118, the main state machine 44 advances to process step 120 and performs a series of actions. First, the main state machine stores the status of the IBG ERROR line in a holding latch in the block status circuit 50, where the latch value is later used to update a corresponding status bit in the microprocessor status register that is also within the circuit 50. The main state machine 44 then resets the IBG detection and latch circuit 54 and also terminates the RELAX IBG DETECT mode, if previously activated, so that the nominal IBG detection thresholds are reinstated in accordance with the applicable mode of operation. Finally, the main state machine 44 activates the timer circuit 74 to commence a timer T1, and thereafter moves to state D, which is shown as process step 122 in FIG. 4a.

In state D, the logic waits for T1 to expire, or for an "All Tracks In Burst" indication. The T1 timer counts off the anticipated time in which a predetermined number of the data tracks, e.g. 100%, should be in burst and ready for PLL acquisition. If T1 has not expired in process step 124, the main state machine tests to determine whether a 100% burst vote has been received in process step 126. If a 100% burst vote has not been obtained, the logic tests whether an IBG was detected in process step 128. If an IBG is detected, the logic returns to state C in order to again test for burst because the read head is assumed to be reading an IBG. If the T1 timer has expired or if a 100% burst vote has been obtained, the logic moves to process step 130 to commence bit synchronization. The main state machine activates the phase lock loop through the PLL ACQUIRE lines. A timer T2 is then started and the main state machine moves to state E, illustrated by process step 132 in FIG. 4a.

In state E, the main state machine 44 waits in process step 134 for the T2 timer to expire. The T2 timer counts off the anticipated time required by the phase lock loop circuit 40 to obtain clock acquisition. The time period is programmable by microcode and a default value is provided if the time period is not programmed. If IBG is detected prior to the expiration of timer T2 in process step 136, it is assumed that a pseudo burst occurred and the read heads are still reading an IBG. Thus, in process step 138, the main state machine turns off the PLL ACQUIRE signal and resets the burst detection and latch circuit 56. Following the expiration of the T2 timer, the PLL ACQUIRE signal is terminated and the TRACK START and FORCE WINDOW lines to the track logic circuit 70 are activated. These signals begin the track logic processing required for detection of the synchronization characters in order to achieve byte synchronization across the tracks. These actions are taken in process step 140, at which time a timer T3 is started and the main state machine moves to state F, which is illustrated as process step 142 in FIGS. 4a and 4b.

In state F, the main state machine awaits the output of the sync voter logic 64 to determine whether a sufficient number of tracks have detected their beginning synchronization characters. The sync vote is tested in process step 144. As indicated, the sync vote criteria is programmable by microcode. If the timer T3 is not expired in process step 146, and a sync vote has not been obtained in process step 144, the main state machine tests for the presence of an IBG in process step 148. If one is detected, the main state machine returns to state C and begins looking for burst because it is assumed that the read heads are still reading an IBG. If the timer T3 expires before obtaining the requisite sync votes, the main state machines moves to process step 150 where it de-asserts the TRACK START and FORCE WINDOW signals and returns to state B to look for IBG. Timer T3 is used to allow sufficient time for a programmed number of tracks to detect their synchronization characters.

If sync vote detection is received in process step 144, the main state machine moves to process step 152 where it saves the burst RWW error status reported by the BURST ERROR line, the signal being stored in a holding latch in the block status circuit 50. The main state machine also activates the ENAB HOT IBG line which raises the threshold for detecting IBG. This threshold is raised while the magnetic read heads are reading within a formatted block in the event the block has been partially overwritten by another block. The IBG HOT threshold ensures that the detection logic will read a true IBG and not a spurious low frequency data pattern within the current block. In process step 152, the main state machine activates the IBG RESET line to reset the IBG detection and latch circuit 54. The main state machine then moves to state G, which is illustrated in FIG. 4b as process step 154.

The main machine remains in state G until the timer T3 has expired in process step 156. During this time, the system checks for IBG in process step 158. If IBG is detected, the FORCE WINDOW line is de-asserted and the main state machine moves to state Y. This condition indicates that the magnetic read heads are still detecting IBG.

Once the timer T3 expires in process step 156, the main state machine moves to process step 162, where it deactivates the FORCE WINDOW line and also deactivates the RELAX BURST line in order to restore the nominal burst detection thresholds and prevent the detection of spurious burst signals within the formatted block. Following process step 162, normal block processing, including an end of block detection algorithm is performed. Thereafter, the main state machine moves to state X, which is illustrated by process step 164 in FIG. 4c.

In state X, the RELAX IBG line is asserted in process step 166 in order to relax the IBG detection threshold used by the IBG detection and latch circuit 54, in preparation for the next IBG. The main state machine then moves to state Y, which is illustrated in FIG. 4c as process step 168.

State Y is a transitory state that performs some of the housekeeping duties that occur at the end of a block. In state Y, the main state machine performs process step 170 which includes deactivating the track read circuits, resetting the IBG detection and latch circuit 54, saving the IBG HOT status in a holding latch in the block status circuit 50, deactivating the ENAB HOT IBG line and activating a timer T19. The main state machine then moves to state Z, which is illustrated in FIG. 4c as process step 172.

In state Z, the main state machine awaits the expiration of timer T19, which is used to identify an anticipated half way point through the next IBG. Once this point is reached via the T19 timer test of process step 174, the main state machine commences process steps 176. The main state machine saves the IBG error status in a holding latch in the block status circuit 50. It also loads the information from the block status circuit holding latches into corresponding bit locations in the microprocessor status registers within the circuit 50, and then clears the holding latches. In other words, all of the status information from the previous block is now reported to the microprocessor so that appropriate action, such as rewriting the block, may occur based on the status values. Following process step 176, the main state machine tests for the read-while-write append (RWWA) mode in process step 178. If the RWWA mode has been selected, the main state machine 44 asserts the RWW MODE SELECT line in process step 180 to select the RWW register bank in the parameter and threshold circuit 48 and thereby dynamically reprogram the applicable threshold criteria. Following the RWWA test, the main state machine 44 tests for IBG in process step 182. If IBG is not detected, the IBG detection and latch circuit 54 is reset in process step 184 and the main state machine returns to state B to look for IBG. Assuming IBG is detected in process step 182, the main state machine resets the IBG detection and latch circuit 54, resets the burst detection and latch circuit 56, sets the RELAX BURST line and moves to state C to look for burst. The foregoing actions are taken in process step 186 in FIG. 4.

It will be seen from the foregoing description that the detection and validation of formatted blocks is implemented using hardware logic circuitry with minimal involvement by the tape drive microprocessor. Advantageously, various thresholds can be programmed for IBG, acquisition burst and synchronization character detection and validation. These thresholds include IBG interval counts, IBG vote counts, acquisition burst interval counts, acquisition burst vote counts and synchronization vote counts. Programmable threshold banks can be used for different modes such as read-only and read-while-write. The threshold banks may contain the same or substantially the same detection thresholds for each mode, with additional read-while-write error validation thresholds being used to ensure data write integrity in the RWW mode. The above-described system facilitates the adjustment of detection thresholds "on-the-fly". These adjustments are provided by the RELAX IBG line, the RELAX BURST line and the ENAB HOT IBG line. Other threshold relaxation and enhancement operations could also be implemented as desired.

Accordingly, although the invention has been described in terms of the specific embodiments, it is possible that modifications and substitutions to various components of the invention would occur to persons of ordinary skill in the art, and therefore, would be within the scope of the invention, which is to be limited only by the claims which follow.

We claim:

1. In a magnetic tape data storage system for reading and writing data on a magnetic tape medium in a plurality of modes, including a read-only (R) mode and a read-while-write (RWW) mode, the data being arranged in one or more tracks in a sequence of formatted blocks, a method for detecting and validating the formatted blocks in conjunction with read/write data transfer operations, the method comprising the steps of:
- (1) detecting one or more formatting entity data patterns using one or more programmable detection thresholds that are the same or substantially the same in both the R and RWW modes;
- (2) determining while in the RWW mode whether said formatting entity data patterns satisfy one or more RWW error validation thresholds that are greater than respective ones of said one or more programmable detection thresholds; and if false
- (3) generating a status message indicating that a data block may need rewriting.

2. The method of claim 1 wherein said detection step includes detecting an inter-block gap pattern, a synchronization burst pattern and a synchronization character.

3. The method of claim 1 wherein said programmable detection and validation thresholds include an interval count threshold.

4. The method of claim 1 wherein said programmable detection and validation thresholds include a track vote threshold.

5. The method of claim 1 wherein said detection step includes dynamically changing one or more of said detection thresholds depending on which formatting entities are being detected in order to raise or lower detection criteria.

6. In a magnetic tape data storage system for reading and writing data on a magnetic tape medium in a plurality of modes, including a read-only (R) mode and a read-while-write (RWW) mode, the data being arranged in one or more tracks in a sequence of formatted blocks, a method for detecting and validating the formatted blocks in conjunction with read/write data transfer operations, the method comprising the steps of:
- (1) detecting while in the R and RWW modes a first data pattern representing an inter-block gap using a first programmable detection threshold;
- (2) detecting while in the R and RWW modes a second data pattern representing a block acquisition burst using a second programmable detection threshold;
- (3) detecting while in the R and RWW modes a third data pattern representing a forward synchronization character using a third programmable detection threshold;
- (4) determining while in the RWW mode whether said first, second or third data patterns satisfy programmable RWW error validation thresholds that are greater than respective ones of said first, second or third detection thresholds; and if false
- (5) generating a status message indicating that a data block may need rewriting.

7. The method of claim 6 further including the steps of relaxing said second detection threshold following the detection of an inter-block gap and restoring said second detection threshold following the detection of said forward synchronization character.

8. The method of claim 6 further including the steps of raising said first detection threshold following the detection of a synchronization character and restoring said first detection threshold following the detection of a data block.

9. The method of claim 6 further including the steps of relaxing said first detection threshold following the detection of a formatted block and restoring said first detection threshold following detection of said inter-block gap.

10. The method of claim 6 wherein said first and second detection thresholds include interval count thresholds corresponding to the number of repeating intervals of said inter-block gap and acquisition burst character patterns, and wherein said third detection threshold is a track voting threshold corresponding to the number of tracks concurrently detecting a synchronization character.

11. The method of claim 6 further including a first timing step of providing a first programmable time period within which to perform said acquisition burst detection step and proceeding to said synchronization character detection step following the expiration of said first programmable time period.

12. The method of claim 11 further including a second timing step of providing a second programmable time period within which to obtain clock acquisition across all data tracks and proceeding to said synchronization character detection step following the expiration of said second programmable time period.

13. The method of claim 12 further including a third timing step of providing a third programmable time period within which to perform said synchronization character detection step.

14. The method of claim 6 wherein said acquisition burst detection step and said synchronization character detection step include the steps of testing for the presence of repeating character patterns representing inter-block gaps and returning to said burst detection step if an inter-block gap repeating character pattern is found during said testing.

15. In a magnetic tape data storage system for reading and writing data on a magnetic tape medium in a plurality of modes, including a read-only (R) mode and a read-while-write (RWW) mode, the data being arranged in one or more tracks in a sequence of formatted blocks, a method for detecting and validating the formatted blocks in conjunction with read/write data transfer operations, the method comprising the steps of:
- (1) detecting a first repeating data pattern representing an inter-block gap using first and second programmable detection thresholds that are the same or substantially the same in both the R and RWW modes;
- (2) detecting a second repeating data pattern representing a block acquisition burst using third and fourth programmable detection thresholds that are the same or substantially the same in both the R and RWW modes;
- (3) detecting a third repeating data pattern representing a forward synchronization character using fifth and sixth programmable detection thresholds that are the same or substantially the same in both the R and RWW modes;
- (4) determining while in the RWW mode whether said first, second or third repeating data patterns satisfy RWW error validation thresholds that are greater than respective ones of said first through sixth thresholds; and if false
- (5) generating a status message indicating that a data block may need rewriting.

16. A magnetic tape data storage system for reading and writing data on a magnetic tape medium in a plurality of modes, including a read-only (R) mode and a read-while-write (RWW) mode, the data being arranged in one or more tracks in a sequence of formatted blocks, said data storage system including a system for detecting and validating the formatted blocks in conjunction with read/write data transfer operations, said detection and validation system comprising:

(1) a storage resource containing one or more programmable R and RWW threshold values that are the same or substantially the same in both the R and RWW modes, and one or more programmable RWW error threshold values that are greater than corresponding ones of said R and RWW threshold values;

(2) an interval count threshold logic circuit, including:
  (a) a first input for receiving one or more input values representing formatting entity data patterns;
  (b) a second input for receiving one or more input values from said storage resource representing said programmable thresholds; and
  (c) an output for generating one or more output values representing formatting entity detection and validation signals;

(3) a track voting threshold logic circuit, including:
  (a) a first input for receiving one or more input characters representing said formatting entity detection signals;
  (b) a second input for receiving one or more input values from said storage resource representing programmable thresholds; and
  (c) an output for generating one or more output values representing formatting entity track vote signals; and (4) a state machine for controlling the operation of said interval count threshold and track voting threshold logic circuits.

17. The data storage system of claim 16 wherein said interval count threshold circuit contains an IBG detection circuit and a burst detection circuit.

18. The data storage system of claim 16 wherein said track voting threshold logic circuit includes a synchronization character voter circuit, an IBG voter circuit and a burst voter circuit.

19. The data storage system of claim 16 wherein said state machine includes an output for generating threshold programming signals to said storage resource.

20. The data storage system of claim 16 wherein said state machine includes an output for generating threshold relaxation and enhancement signals to said interval count threshold logic circuit.

21. In a magnetic tape data storage system for reading and writing data on a magnetic tape medium in a plurality of modes, including a read-only (R) mode and a read-while-write (RWW) mode, the data being arranged in one or more tracks in a sequence of formatted blocks, a method for detecting and validating the formatted blocks in conjunction with read/write data transfer operations, the method comprising the steps of:

(1) detecting one or more formatting entity data patterns using a storage resource containing a first bank of programmable thresholds corresponding to the R mode and a second bank of programmable thresholds corresponding to the RWW mode; and (2) selecting between said first and second banks of programmable thresholds depending on the mode of operation of the magnetic tape data storage medium, (3) wherein said first and second banks of programmable thresholds include read-only and RWW thresholds that are substantially the same and wherein said second bank of programmable thresholds also includes one or more RWW error thresholds that are higher than the corresponding ones of said read-only and RWW thresholds.

* * * * *